S. B. SEXTON.
Frying Pan.
No. 44,346.
Patented Sept. 20, 1864.
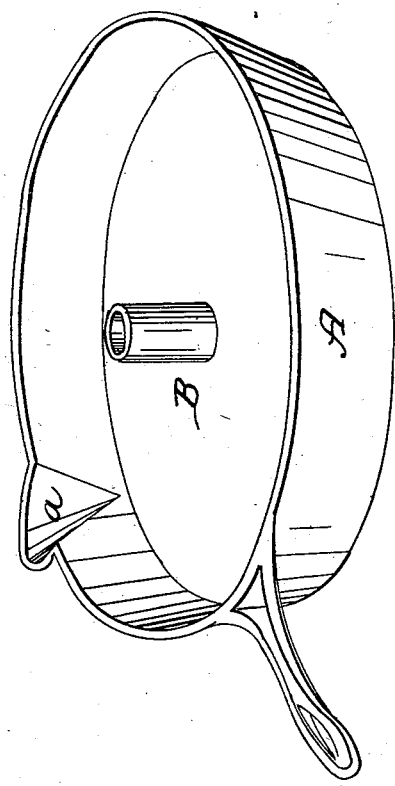
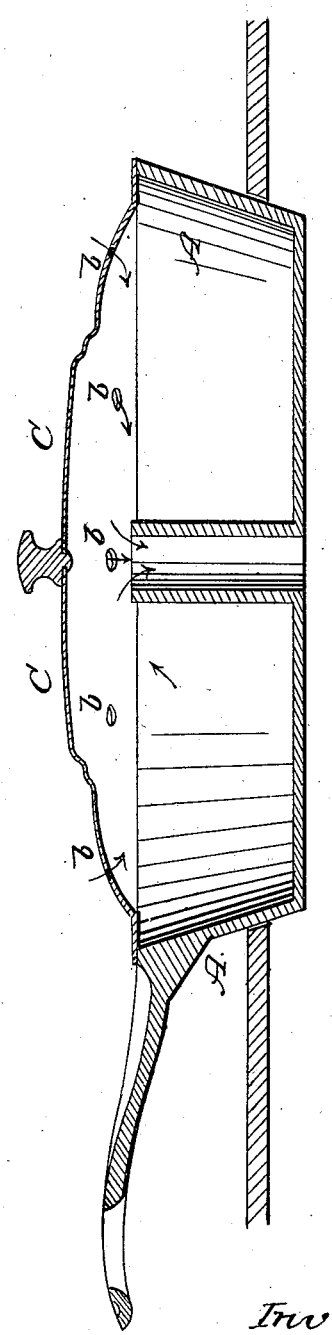
Witnesses
R. T. Campbell
E. Schafer.
Inventor
S B Sexton
by his Attys
Mason Fenwick & Lawrence

UNITED STATES PATENT OFFICE.

S. B. SEXTON, OF BALTIMORE, MARYLAND.

IMPROVED FRYING-PAN.

Specification forming part of Letters Patent No. 44,316, dated September 20, 1864.

*To all whom it may concern:*

Be it known that I, S. B. SEXTON, of Baltimore, county of Baltimore, State of Maryland, have invented a new and useful Improvement in Culinary Vessels; and I do hereby declare that the following is a full, clear, and exact description thereof, reference being had to the accompanying drawings, making a part of this specification, in which—

Figure 1 is perspective view of a frying-pan, with the cover removed. Fig. 2 is a diametrical section through a frying-pan having my invention applied to it.

Similar letters of reference indicate corresponding parts in the two figures.

The object of my invention is to prevent the escape of smoke, steam, and other disagreeable odors from culinary vessls into the room where articles are being cooked, and to accomplish this object in a very simple, cheap, and effective manner, as will be hereinafter described.

To enable others skilled in the art to make and use my invention, I will describe its construction and operation.

Fig. 1 of the accompanying drawings represents a frying-pan having my invention applied to it. This form of a pan may be used with a perforated or an imperforated cover, whichever may be desired, as the external air will be admitted through the opening at the nose *a*; but where the pans or vessels to which my invention is applied have no such provision as the nose *a* for the entrance of air when covered, openings must be made at *b* through the cover, as shown in the sectional view, Fig. 2.

The nature of my invention consists in providing a vessel, A, with a tube or flue, B, projecting up a suitable distance from its bottom, and forming a communication between the interior of the pan and the fire-chamber of a stove when said pan is set into a hole through a stove-plate. So that when such a pan is thus arranged and finished with a cover, C, the fumes of the cooking articles will be drawn down through the tube B into the stove, and thence carried off with the products of combustion up the chimney.

I have represented the tube B arranged in the center of the vessel A, but it is obvious that this tube may be located nearer to the side of the pan, or that a number of tubes or flues can be applied to the pan for conducting the disagreeable odor of cooking articles down through its bottom into the fire-chamber of the stove. I have also represented said flue or tube B cylindrical and cast with the pan, but it will be found by making these tubes conical, so as to allow one pan to be fitted into another, that the pans can be packed away in nests for transportation in as compact a shape as the common pans, or such as are not provided with my improvement, and instead of casting the tubes B with their pans these tubes may be applied afterward in any suitable manner. The tubes need not extend above the top of the pan, as I have represented in Fig. 2, but should they be made in this way the cover C must be dished so as not to obstruct the draft down through this flue.

The success of my invention depends upon creating a draft through the flues B, and this draft can only be created by covering the pan as I have above described, and making provision for allowing a current or currents of air to pass into and through it.

The cover of the vessel may be made with a hinge-fastening, or it may be applied so as to be removed at pleasure.

The pan may be made of cast or wrought metal, and the flue-tube may be screwed, riveted, or secured in any suitable manner.

When the pan is arranged for use upon a stove, the currents of air, smoke, &c., will take the course indicated by the arrows in Fig. 2, if the cover C fits tightly around its edge; but if openings are made in the side of the pan the current will take the direction indicated by the arrows in Fig. 1.

I do not claim, broadly, as my invention conducting the steam, &c., from boiling water confined in culinary vessels into the smoke-pipe, or even into the fire-chamber beneath the vessels, for this has been done before; but What I do claim as new, and desire to secure by Letters Patent, is—

1. So constructing a vessel of the character herein described that when in use a current or currents of external air will be conducted through it by the natural draft of the stove in such manner as to carry off the fumes arising in said vessel, substantially as described.

2. Providing a culinary vessel with a flue or flues, B, through its bottom, and also with a perforated cover, C, or the equivalent thereof, substantially as described.

3. A frying-pan constructed with a flue, B, through its bottom, substantially as described and shown.

S. B. SEXTON.

Witnesses:
 J. B. CONKLIN,
 SAML. McCOY.